Sept. 10, 1957    J. D. PETERSON    2,806,118
CONTROL SYSTEM FOR ELIMINATING ICE FROM
A TRANSPARENT WINDSHIELD PANEL
Filed Dec. 31, 1948    3 Sheets-Sheet 1

INVENTOR.
JOEL D. PETERSON
BY
ATTORNEY

Sept. 10, 1957  J. D. PETERSON  2,806,118
CONTROL SYSTEM FOR ELIMINATING ICE FROM
A TRANSPARENT WINDSHIELD PANEL
Filed Dec. 31, 1948  3 Sheets-Sheet 2

FIG. 2

INVENTOR.
JOEL D. PETERSON
BY
-ATTORNEY-

United States Patent Office 2,806,118
Patented Sept. 10, 1957

2,806,118

CONTROL SYSTEM FOR ELIMINATING ICE FROM A TRANSPARENT WINDSHIELD PANEL

Joel D. Peterson, Ridgewood, N. J., assignor to Bendix Aviation Corporation, Teterboro, N. J., a corporation of Delaware Application December 31, 1948, Serial No. 68,594

3 Claims. (Cl. 219—20)

The present application relates to a novel windshield heater control system for the elimination of ice from a transparent windshield panel.

An object of the invention is to provide a novel system for controlling the application of heat to the windshield of an aircraft to effect the removal and prevention of the accumulation of ice thereon.

Another object of the invention is to provide a windshield heater control in which a thermal sensitive bridge is used to control the power supplied to heating means embedded in the windshield, and in which the temperature sensing elements of the bridge circuit are embedded in the windshield.

The above and other objects and features of the invention will appear more fully hereinafter from a consideration of the following description taken in connection with the accompanying drawings wherein an embodiment of the invention is illustrated by way of example.

In the drawings:

Figure 2 is a schematic diagram of the amplifier and controller for the windshield heater.

Figure 1:
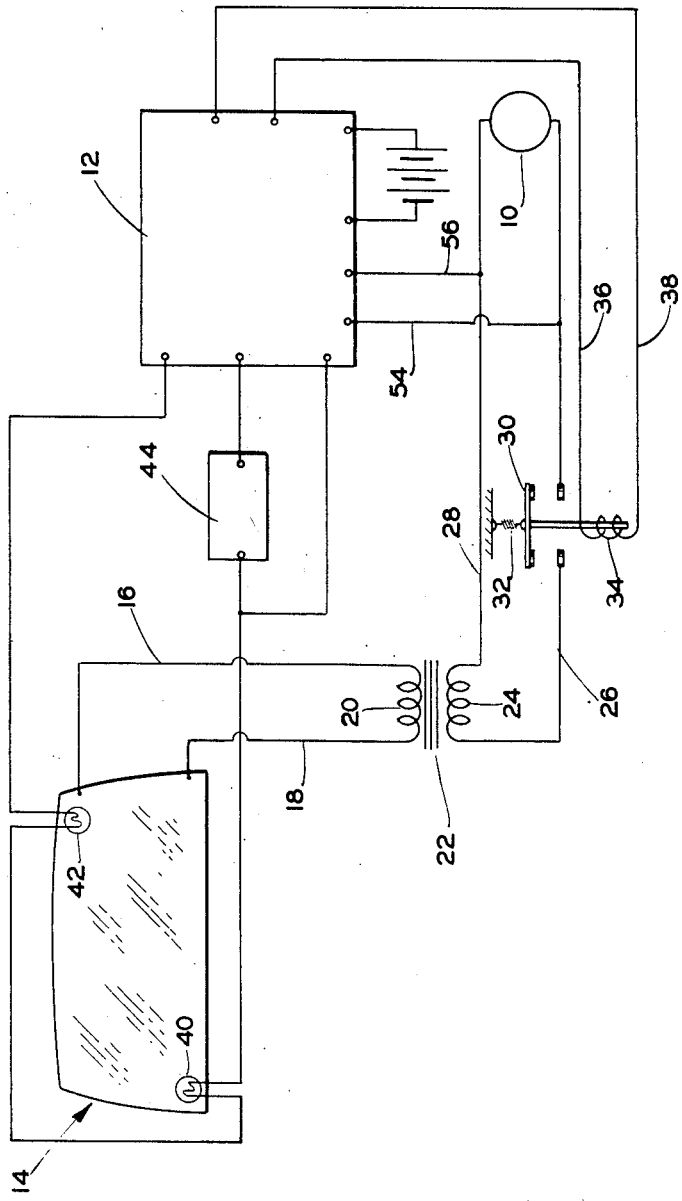
Figure 1 is a schematic diagram of a control system for a windshield heater.

Referring to the drawing of Figure 1, there is indicated by the numeral 10 an alternator of suitable type and which may be driven by an aircraft engine as a source of power, and a controller 12 which is arranged to modify the output voltage applied by the alternator 10 to a windshield heater 14.

The heater 14 of the windshield may be a transparent electrical conducting coating applied to the windshield and of a type such as sold under the trade names Nesa and Electra-Pane. The latter electrical conducting resistor or heater is connected by conductors 16 and 18 to the secondary winding 20 of a step up transformer 22. The transformer 22 has a primary winding 24 connected by conductors 26 and 28 to the output of an alternator 10. The conductor 26 is controlled by a main control relay switch 30 biased by a spring 32 to a normally open position and to a closed position by an electromagnetic winding 34 connected by electrical conductors 36 and 38 to the controller 12.

To control the temperature of the windshield heater 14, temperature sensing elements 40 and 42 are embedded in the windshield panel, as will be explained, and used as a master to determine the duty cycle of power from the alternator 10 to be applied to the heater resistor 14.

Amplifier and controller

The temperature sensing elements 40 and 42 are connected in series, as shown in Figures 1 and 2, so as to provide one leg of a bridge circuit 43. A non-thermal sensitive reference resistor 44 serves as another leg of the bridge, and the remaining legs are provided by the windings 46 and 48 forming the secondary of the transformer 50. The bridge circuit is supplied with alternating current by the primary winding 52 of the transformer 50 inductively coupled to the secondary windings 46 and 48. The winding 52 is connected to the A. C. source 10 through conductor 54 and 56.

Output conductors 58 and 60 lead from the bridge 43 to the grid 62 and cathode 64, respectively, of an electronic valve 66 having a plate 68 and heater 70. The electronic valve 66 provides a first stage of amplification and is coupled to successive additional stages of amplification provided by electronic valves 72, 74 and 76, each having cathode, grid, plate and heater elements.

A D. C. negative bias is applied to the cathode of the valves 66, 72 and 74 relative to the plates of the respective valves through a common conductor 78 leading from the negative terminal of a source of electrical energy 80. The positive terminal of the source of electrical energy is connected by a common conductor 82 to the plates of the respective valves 66, 72 and 74 through suitable resistor elements, as shown in Figure 2.

The plate 68 of valve 66 is coupled to the grid of valve 72 through a capacitor 84. Similarly the plate element of the valve 72 is coupled to the grid element of valve 74 by a capacitor 86. Likewise, the plate element of the valve 74 is coupled to the grid of the valve 76 by a capacitor 88. A negative bias is applied to grid elements of the valves 72 and 74 through resistors 90 and 92 connected to the common conductor 78.

An A. C. bias is applied to the last stage of amplification by the A. C. source 10 connected across the primary winding 52 of the transformer 50 which is in turn connected to the cathode element of the electronic valve 76 through conductor 94 leading from a tap connection 96 of the primary winding 52. The grid of the valve 76 is connected through resistor 98, and conductor 78 to the output line 56 of the A. C. source 10, which leads to one end of the primary winding 52. The opposite end of the primary winding 52 is connected by a conductor 100 through electromagnetic pilot relay winding 102 to the plate element of the electronic valve 76.

The pilot relay 102 controls an armature element 104 pivoted at 106 to control a switch arm 108 arranged to close switch contacts 110 upon sufficient energization of the relay winding 102. Closing of the switch contacts 110 closes a circuit from the D. C. source of electrical energy 80 through conductors 36 and 38 to effect energization of the main relay, as shown in Figure 1.

In operation the bridge 43 is balanced by initial adjustment of the reference resistor 44 at the desired temperature of, for example, 100° Fahrenheit so that a decrease in the temperature below the latter value will cause the bridge to unbalance. This unbalance, after amplification, causes operation of the pilot relay 102 which controls through the main relay 34 the power to the transformer 22. This is an on-off control system and the controller 12 is designed with a dead zone of ±5° from the control point. That is, if the temperature falls below 95° F., full power is applied to the windshield 14, and the power is not shut off until the temperature exceeds 105° F.

The system is further arranged so as to be phase sensitive by providing an A. C. bias on the electronic valve 76 or last stage of amplification from the source of A. C. 10. Thus, upon the bridge circuit 43 unbalancing upon an increase in the windshield temperature above the 105° F. limit, the energization of the relay winding 102 cuts off, since the out of balance signal passed by the bridge 43 and applied across the cathode, and grid of the valve 76 will then be 180 degrees out of phase with the A. C. bias applied across the plate and cathode of the valve 76 by the A. C. source 10. However, upon the temperature of the windshield decreasing below the 95° F. limit, the out of balance signal passed by the bridge and applied across the cathode and grid of the valve 76 will then be in phase with the A. C. bias applied across the plate and cathode of the valve 76 by the A. C. source 10 so as to then effect energization of the pilot relay winding 102, which will then in turn close the main relay switch 30 to effect energization of the heater for the windshield 14 which as explained may be in the form of a transparent electrical conductive coating of a type well known in the art.

*Temperature sensing element*

Figure 3:
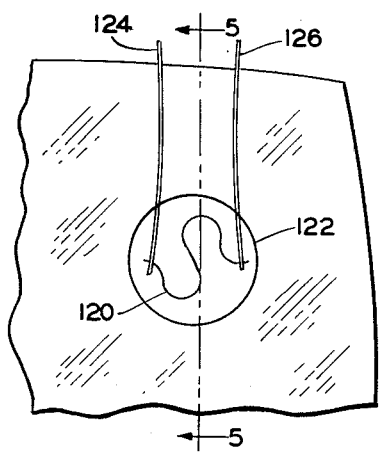
Figure 3 is a fragmentary plan view of a windshield with the thermal indicator embedded therein.
Figure 4:
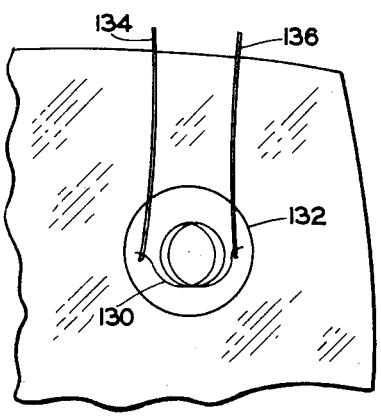
Figure 4 is a plan view of a modified form of thermal indicator.

The temperature sensing elements indicated in Figures 3 and 4, now the subject matter of divisional application Serial No. 151,009, filed March 21, 1950, may be formed in a curved loop 120 of a suitable temperature sensitive material having a positive temperature coefficient of resistance such as tungsten or nickel. The loop, as shown in Figure 3, may be molded into a transparent disk 122 of a material such as Vinylite, and shimstock connecting leads 124 and 126 provided. Alternately, the temperature sensing element may be made, for example, of ten inches of .002 inch diameter nickel wire wound in a flat spiral 130 to an outside diameter of one inch. The flat spiral may in turn be molded into a transparent plastic disk 132 of Vinylite and shimstock connecting leads 134 and 136 provided as shown in Figure 4.

Figure 6:
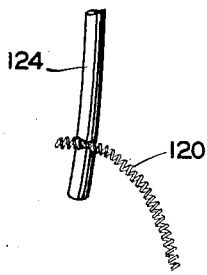
Figure 6 is an enlarged fragmentary view showing the spring construction of the thermal indicator.

The temperature sensing element 120 and 130 of Figures 3 and 4 is wound in the form of a fine wire spring so as to give to the element sufficient elasticity so that the same will not break in the fabrication of the element in the plastic disk. The fine wire spring construction of the temperature sensing element is best shown in the enlarged fragmentary view of Figure 6.

*Windshield*

Figure 5:
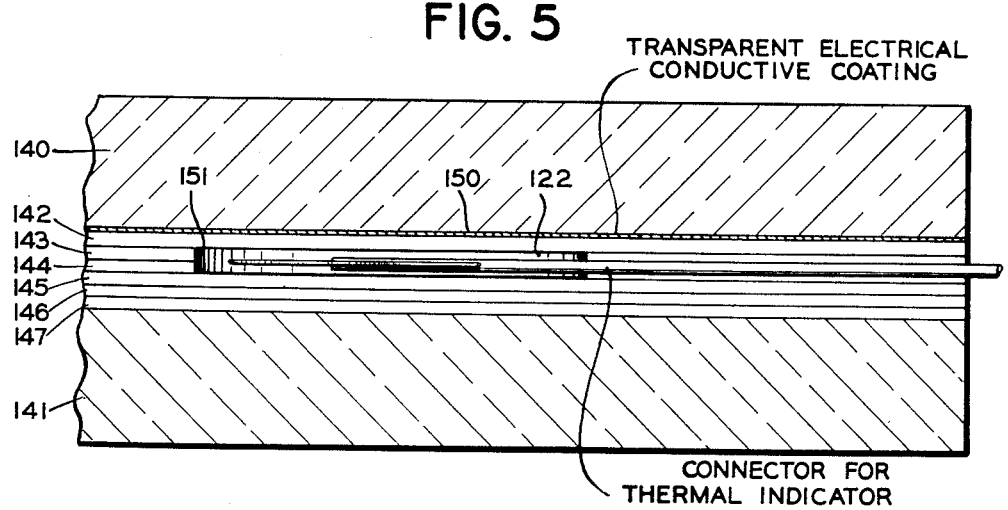
Figure 5 is an enlarged fragmentary end view of the windshield of Figure 3 showing the layer construction of the windshield and with the thermal indicator embedded therein.

The windshield 14 is formed with clear plastic or glass outer layers 140 and 141, as shown in Figure 5, and clear plastic inner layers 142, 143, 144, 145, 146 and 147 formed of Vinylite or other suitable material. Between the glass outer layer 140 and the inner layer 142, there is provided a transparent electrical conductive coating 150 of a material well known in the art, such as commonly sold under the trade names Nesa and Electra-Pane.

An opening 151 is provided in the layers 143 and 144 of a size equal to that of the disk of the temperature sensing element. As shown in Figure 5, the disk 122 is embedded in the opening 151 of the plastic layers 143 and 144 and the layers 143 and 144 positioned in place with relation to the several layers 140, 141, 142, 145, 146 and 147, as shown in Figure 5.

The connecting leads 124 and 126 are brought out between the plastic layers 143 and 144 and sufficient high temperatures are then applied to the entire assembly so that disk 120 blends with the layers of Vinylite so as to form an integral part of the windshield assembly. The plane of the fine wire loop 120 or spiral 130 is arranged in parallel relation to the plane of the conducting coating 150 on the glass and may be positioned at a distance of, for example, .030 inch away from it, being separated by the layer 142 of the Vinylite plastic material. The plastic material for the disks 122 and 132 may be the same as that for the layers 143 and 144 of the windshield, so that in the completed panel only the small loop 120 and leads 124—126 or spiral 130 and leads 134—136 will be visible in the corners of the windshield 14, as shown in Figure 1. While two of the elements 40 and 42 are shown in Figure 1, a single temperature sensitive element or a plurality of such elements may be provided as may be deemed necessary.

Although only one embodiment of the invention has been illustrated and described, various changes in the form and relative arrangements of the parts may be made to suit requirements.

What is claimed is:

1. The combination comprising a transparent windshield panel, a heater element embodied in said panel, a source of electrical energy, means for operatively connecting said source of electrical energy to said heater element for energizing said heater element, electronic amplifier means for controlling said connecting means and thereby the energization of said heater element, a variable resistance temperature sensitive element embedded in said transparent panel and responsive to the temperature appurtenant to said panel, means for operatively connecting said temperature sensitive element to said amplifier means for controlling said amplifier means and thereby said connecting means, said connecting means including a pilot relay switch controlled by said amplifier, a main relay switch controlled by said pilot relay switch, and said main relay switch controlling the connection of said source of electrical energy to said heater element so as to maintain the temperature of the windshield within a predetermined range.

2. A system for the elimination of ice from a transparent panel, comprising a heater element embedded in said panel, a source of alternating current, means for operatively connecting said source of alternating current to said heater element for energizing said heater element, electronic amplifier means for controlling said connecting means and thereby the energization of said heater element, a variable resistance temperature sensitive element embedded in said transparent panel and responsive to the temperature appurtenant to said panel, means for operatively connecting said temperature sensitive element to said amplifier means, said amplifier means including an electronic valve having a plate, a cathode and a control grid, said plate and cathode being connected across the source of alternating current, and means connecting the control grid and cathode across the source of alternating current so as to apply an alternating bias to the control grid; the means for operatively connecting the temperature sensitive element to the amplifier means including a bridge circuit, said temperature sensitive element providing one leg of said bridge circuit to balance the bridge circuit at a predetermined temperature, said bridge circuit having an input and an output, means connecting the source of alternating current across the input to said bridge circuit, means connecting the output of said bridge circuit across the cathode and control grid of said electronic valve of the amplifier; and the means for operatively connecting the source of alternating current to the heater element including a pilot relay having a control winding connected in circuit with the plate of the electronic valve, said pilot relay including a switch operated by said control winding, said control grid being so biased that said control winding is energized through said plate circuit to close said pilot switch only upon the temperature of the windshield being less than a predetermined minimum, a main relay switch controlled by said pilot switch to effect energization of the windshield heater element to prevent the accumulation of ice on the windshield.

3. In combination, a transparent panel, a heater element embedded within said panel, an electronic amplifier to control energization of the heater element, said amplifier including an electronic valve having a plate, a cathode and a control grid, a source of alternating current, means connecting said source of alternating current across said plate and cathode, a bridge circuit having an input and an output, means connecting the source of alternating current across the input to said bridge circuit, means connecting the cathode and control grid of said electronic valve across the output of said bridge circuit, a resistor element variable with temperature and connected in one leg of said bridge circuit, said resistor element embedded in said windshield and responsive to the temperature appurtenant to said windshield, relay means energized by the cathode plate circuit to control energization of the heater element, and means connecting said source of alternating current across the grid and cathode to bias the grid and cathode so that operation of the relay means may be effected to cause energization of the heater element only upon the temperature of the panel being less than a predetermined minimum and to thereby prevent by the heat from the heater element an accumulation of ice on the windshield.

References Cited in the file of this patent

UNITED STATES PATENTS

| Number | Name | Date |
|---|---|---|
| 1,632,363 | Bull | June 14, 1927 |
| 1,694,264 | Hull | Dec. 4, 1928 |
| 2,006,006 | Zaiger | June 25, 1935 |
| 2,269,566 | Van Daam | Jan. 13, 1942 |
| 2,282,441 | Whitlock | May 12, 1942 |
| 2,318,102 | Ruge | May 4, 1943 |
| 2,319,534 | Crowley | May 18, 1943 |
| 2,346,560 | Crosthwait, Jr. et al. | Apr. 11, 1944 |
| 2,404,147 | Strickland | July 16, 1946 |
| 2,429,420 | McMaster | Oct. 21, 1947 |
| 2,441,831 | Moore | May 18, 1948 |
| 2,462,207 | Mershon | Feb. 22, 1949 |
| 2,470,633 | Mershon | May 17, 1949 |
| 2,488,580 | Burleigh | Nov. 22, 1949 |
| 2,490,433 | Gunning et al. | Dec. 6, 1949 |
| 2,513,993 | Burton | July 4, 1950 |
| 2,519,109 | Callender | Aug. 15, 1950 |
| 2,522,826 | Hooven | Sept. 19, 1950 |
| 2,552,480 | Dickey | May 8, 1951 |
| 2,556,065 | Callender | June 5, 1951 |
| 2,557,905 | Burton et al. | June 19, 1951 |